10294722B2

(12) United States Patent
Foerster et al.

(10) Patent No.: US 10,294,722 B2
(45) Date of Patent: May 21, 2019

(54) DEVICE FOR PRODUCING A BORE IN THE GROUND, ROTARY DRIVE DEVICE AND ROTARY SEAL ARRANGEMENT

(75) Inventors: Frank Foerster, Viersen (DE); Thomas Dolls, Heinsberg (DE)

(73) Assignee: AKER WIRTH GMBH, Erkelenz (DE)

( * ) Notice: Subject to any disclaimer, the term of this patent is extended or adjusted under 35 U.S.C. 154(b) by 1133 days.

(21) Appl. No.: 14/234,633

(22) PCT Filed: Jul. 12, 2012

(86) PCT No.: PCT/EP2012/063691
§ 371 (c)(1),
(2), (4) Date: Jan. 24, 2014

(87) PCT Pub. No.: WO2013/013993
PCT Pub. Date: Jan. 31, 2013

(65) Prior Publication Data
US 2014/0175749 A1    Jun. 26, 2014

(30) Foreign Application Priority Data
Jul. 27, 2011    (DE) .......................... 10 2011 052 182

(51) Int. Cl.
*E21B 3/02*    (2006.01)
*E21B 3/04*    (2006.01)
(Continued)

(52) U.S. Cl.
CPC .................. *E21B 3/02* (2013.01); *E21B 3/04* (2013.01); *E21B 4/003* (2013.01); *E21B 19/10* (2013.01);
(Continued)

(58) Field of Classification Search
CPC ... E21B 3/02; E21B 3/04; E21B 19/10; E21B 33/04; E21B 33/08; E21B 33/085; E21B 4/003
See application file for complete search history.

(56) References Cited

U.S. PATENT DOCUMENTS 2,891,771 A    6/1959 Ashton
3,666,333 A *  5/1972 Dicky ...................... F16J 15/40
                                                    384/479
(Continued)

FOREIGN PATENT DOCUMENTS

CN    201016272 Y    2/2008

*Primary Examiner* — David J Bagnell
*Assistant Examiner* — Tara E Schimpf
(74) *Attorney, Agent, or Firm* — Norman B. Thot

(57) ABSTRACT

A device for producing a bore in the ground includes a spindle comprising a rotary lead-through and a first sealing face configured to be cylindrical. The spindle is configured so as to be rotatably led through a housing via the rotary lead-through. The housing comprises a second sealing face configured to be concentric with respect to the first sealing face. A rotary seal arrangement is configured to seal the rotary lead-through of the spindle through the housing. The rotary seal arrangement comprises a shaft seal configured to act between the first sealing face of the spindle and the second sealing face of the housing. A labyrinth seal is arranged upstream of the shaft seal when viewed from an outside of the housing.

9 Claims, 3 Drawing Sheets

(51) Int. Cl.
  *E21B 33/04* (2006.01)
  *E21B 33/08* (2006.01)
  *E21B 19/10* (2006.01)
  *F16J 15/447* (2006.01)
  *E21B 4/00* (2006.01)

(52) U.S. Cl.
  CPC .............. *E21B 33/04* (2013.01); *E21B 33/08* (2013.01); *E21B 33/085* (2013.01); *F16J 15/4476* (2013.01)

(56) References Cited

U.S. PATENT DOCUMENTS

| | | |
|---|---|---|
| 4,022,479 A | 5/1977 | Orlowski |
| 4,098,341 A * | 7/1978 | Lewis .................... E21B 33/06 166/387 |
| 4,339,161 A | 7/1982 | May |
| 4,416,337 A | 11/1983 | Phillips et al. |
| 7,213,660 B2 | 5/2007 | Martin |
| 2008/0210437 A1 | 9/2008 | Wells et al. |

\* cited by examiner

DEVICE FOR PRODUCING A BORE IN THE GROUND, ROTARY DRIVE DEVICE AND ROTARY SEAL ARRANGEMENT

CROSS REFERENCE TO PRIOR APPLICATIONS

This application is a U.S. National Phase application under 35 U.S.C. § 371 of International Application No. PCT/EP2012/063691, filed on Jul. 12, 2012 and which claims benefit to German Patent Application No. 10 2011 052 182.8, filed on Jul. 27, 2011. The International Application was published in German on Jan. 31, 2013 as WO 2013/013993 A2 under PCT Article 21(2).

FIELD

The present invention relates to a device for producing a bore in the ground, the device including a spindle which is led rotatably through a housing, and with a rotary seal arrangement with which a rotary lead-through of the spindle through the housing can be sealed, which seal arrangement comprises a shaft seal which acts between a cylindrical first sealing face of the spindle and, concentrically thereto, a second sealing face of the housing. The present invention also relates to the rotary seal arrangement of such a device.

BACKGROUND

Such devices have previously been described. The housing can be part of a flushing head. The device normally comprises a rotary table for rotatably driving the spindle. The housing can also be part of a power rotary head (also technically referred to as a "top drive"). The power rotary heads are normally arranged on a drilling rig to be displaceable in the direction of advance of the bore and comprise a driven spindle to which (optionally in segments) the drill pipe can be connected. The power rotary heads are also displaced at the same time when displacing the drill pipe during advancing or when extracting the drill pipe. In contrast, in the direction of advance, the rotary table is arranged stationary in the drilling mast. The drill pipe is movable in the longitudinal direction, but is led through in a rotationally fixed manner. The flushing heads, which serve to rotatably connect the drill pipe to the non-rotatable flushing pipe arrangement, are displaced together with the drill pipe.

Such devices normally comprise a housing with rotary lead-throughs through which the spindles are led through to the outside. In order to avoid outside contaminants from entering into the interior of the housing and lubricant, which are optionally contained in the housing, from escaping to the outside, the devices comprise rotary seal arrangements by means of which the rotary lead-throughs of the spindle through the housing can be sealed. These rotary seal arrangements consist substantially of an elastic shaft seal which acts between a first cylindrical sealing face of the spindle and, concentrically thereto, a second sealing face of the housing.

The shaft seals are subjected to high mechanical load during operation, resulting in high wear, particularly due to outside contaminants.

SUMMARY

An aspect of the present invention is to provide a device of the aforementioned type, and a rotary seal arrangement thereof, where wear is reduced.

In an embodiment, the present invention provides a device for producing a bore in the ground which includes a spindle comprising a rotary lead-through and a first sealing face configured to be cylindrical. The spindle is configured so as to be rotatably led through a housing via the rotary lead-through. The housing comprises a second sealing face configured to be concentric with respect to the first sealing face. A rotary seal arrangement is configured to seal the rotary lead-through of the spindle through the housing. The rotary seal arrangement comprises a shaft seal configured to act between the first sealing face of the spindle and the second sealing face of the housing. A labyrinth seal is arranged upstream of the shaft seal when viewed from an outside of the housing.

BRIEF DESCRIPTION OF THE DRAWINGS

The present invention is described in greater detail below on the basis of embodiments and of the drawings in which.

DETAILED DESCRIPTION

Figure 1:
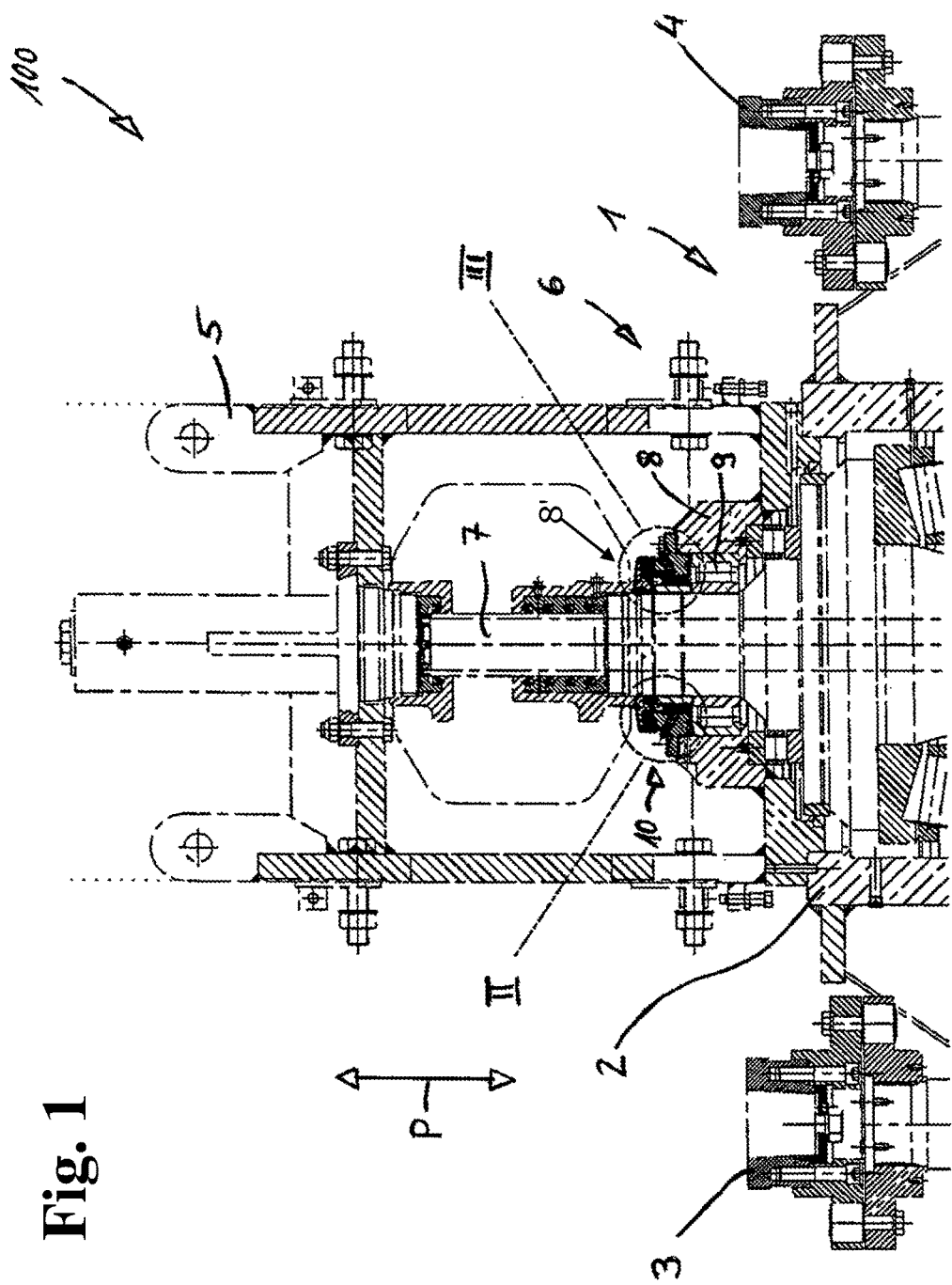
FIG. 1 shows a section along the rotational axis of an embodiment.

The present invention provides a labyrinth seal arrangement upstream of the shaft seal, as viewed from the outside of the housing.

The term "labyrinth seal arrangement" includes all contactless shaft seals whose sealing effect is based on an extension of the sealing path.

This measure significantly reduces the amount of contaminants that act on the shaft seal located between the cylindrical first sealing face of the spindle and, concentrically thereto, the second sealing face of the housing. This shaft seal is thus subjected to considerably less wear than the seal used in previously described devices. Downtimes of the device according to the present invention due to failure of the seal are significantly reduced.

In order to facilitate assembly and disassembly of the shaft seal, an embodiment of the device according to the present invention provides that the second sealing face, upon which the shaft seal acts, can, for example, be formed on a housing cover through which the spindle passes. A first sequence of rings and grooves, which form a portion of the labyrinth seal on the housing, is moreover provided on this housing cover.

In an embodiment of the present invention, this first sequence of rings and grooves can, for example, be provided on a front side of the housing cover.

In an embodiment of the device of the present invention, a rotary cover can, for example, be provided which is connected to the spindle in a rotationally fixed manner, and which has a second sequence of rings and grooves that form the second portion of the labyrinth seal.

If the first sequence of rings and grooves is provided on a front side of the housing cover, the second sequence of rings and grooves is provided on a front side of the rotary cover, which front side is located opposite to the front side of the housing cover. The assembly of the rotary seal arrangement of the device according to the present invention is thereby facilitated since, for engaging the first and second sequences of rings and grooves with each other, the rotary cover only needs to be shifted in the longitudinal direction of the spindle towards the cover.

Assembling the seal arrangement is again facilitated if the second sealing face, with which the shaft seal interacts, is provided on a sealing sleeve that is connected to the spindle in a rotationally fixed manner, and if the rotary cover is connected to the sealing sleeve in a rotationally fixed manner. The front side of the sealing sleeve that is oriented towards the rotary cover can, for example, be formed to provide the rotationally fixed mounting of the rotary cover on the spindle. Due to this configuration, it is moreover not required to rework the spindle in the event of wear on the second sealing face; only the sealing sleeve must be reworked or replaced.

In an embodiment of the present invention, the housing cover can, for example, comprise a first lubricant feed channel by means of which lubricant can be fed to the shaft seal, and a second lubricant feed channel by means of which lubricant can be fed to the labyrinth seal. A lubricant having a material composition and viscosity suitable for generating the best possible sealing effect and a minimum of wear can thereby be fed to the shaft seal, and the labyrinth seal can be provided with a lubricant that, where applicable, has a different material composition and viscosity and which optimizes the sealing effect of the labyrinth seal and accordingly prevents in the best possible way that dirt particles can reach the shaft seal.

The device can, for example, be a device for producing a substantially vertical bore in the ground, wherein the rotary seal arrangement can, for example, be the upper rotary seal arrangement of a flushing head or a rotary drive device that is designed as a power rotary head.

Previously described devices, for example, rotary drive devices, in particular if they are designed as power rotary heads, already have housing covers and rotary covers. The present invention thus achieves the advantage that previously described devices can be retrofitted so as to form a device according to the present invention by exchanging the housing cover and the rotary cover so that the rotary seal arrangement in itself, and a rotary drive device provided therewith, and a flushing head provided therewith, are also of independent inventive importance.

The present invention is hereafter further explained under reference to the drawings in which an embodiment of the device according to the present invention schematically and partially illustrates an exemplary power rotary head.

The device illustrated in FIG. 1 and designated as a whole by 100 comprises a power rotary head 1 for driving on the head side a drill pipe, the power rotary head 1 comprising a housing 2 which accommodates a reduction gear and to which drive motors are flange-mounted via couplings 3, 4 that act on the reduction gear. Such a power rotary head is described, for example, under the designation DDM 1000 2M from the company Aker Solutions. Attached to the housing 2 is a fastening device which, as a whole, is designated by 5, and by means of which the power rotary head can be connected to a lifting device which is not illustrated in the drawing and by means of which the power rotary head can be lifted and lowered according to the arrow P. The power rotary head 1 forms a rotary drive device 6 of the device 100 by means of which a spindle 7 can be set in rotation, to which spindle 7 a drill pipe, which is not visible in the drawing, can be coupled in a manner known per se.

The spindle 7 is led through the housing 2. At the upper exit side of the housing 2, a housing cap 8 is provided through which the spindle 7 is led in a rotatable manner by means of a roller bearing 9. The housing cap 8 and the roller bearing 9 act as a rotary lead through 8' of the spindle 7.

Figure 2:
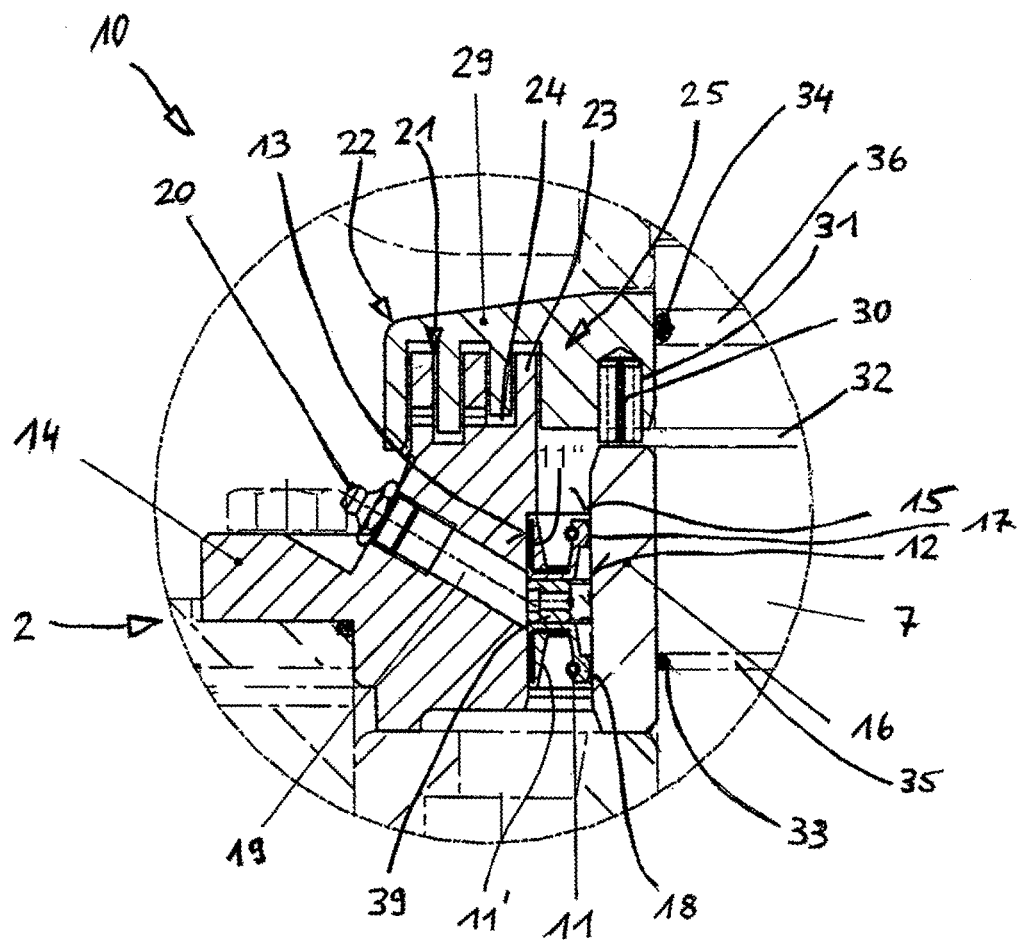
FIG. 2 shows the detail II in FIG. 1 in an enlarged illustration.

For sealing the rotary lead-through, a rotary seal arrangement 10 is provided, the construction and operating principle of which is described in greater detail below with reference to the FIGS. 2 and 3.

The rotary seal arrangement 10 comprises a shaft seal 11 that acts between a cylindrical first sealing face 12 of the spindle 7 and, concentrically thereto, a second sealing face 13 of a housing cover 14 that forms a portion of the housing 2. The first sealing face 12 is not formed directly by the lateral surface of the spindle 7, but by the outer lateral surface 15 of a sealing sleeve 16 that is connected to the spindle 7 in a rotationally fixed manner. The shaft seal 11 comprises two conventional elastic shaft sealing rings 11', 11" that are spaced apart from each other by means of a spacer ring 39 and are mounted on the housing cover 14 in a rotationally fixed manner. The shaft seal 11 has two sealing lips 17, 18 which, supported by a tension spring, rest slidingly against the first sealing face 12.

In the housing cover 14, a first lubricant feed channel 19 is incorporated through which lubricant can be fed to the shaft seal region between the two sealing lips 17, 18. The feed channel is closed from the outside by a lubricating nipple 20, to which a device for feeding lubricant can optionally be connected.

On the front side 21 of the housing cover 14 that faces upwards in the drawing, a first sequence 22 of rings 23 and grooves 24 is provided which form the housing portion of a labyrinth seal 25 that is arranged upstream of the shaft seal 11.

The second portion of the labyrinth seal 25 is formed by a second sequence 26 of rings 27 and grooves 28 which are engaging with the rings 23 and grooves 24 of the first sequence 22. The second sequence 26 is provided on a rotary cover 29 which is connected to the spindle 7 in a rotationally fixed manner. For this purpose, a pin 30, which can, for example, be a dowel pin, is provided which is located in a blind hole 31 of the rotary cover 29 and interacts with a clamping ring 32 that rests on the spindle 7.

O-rings 33, 34 that rest in the receiving grooves 35, 36 serve to seal, between the spindle 7 and the sealing sleeve 16 and between the spindle and the rotary cover 29.

Figure 3:
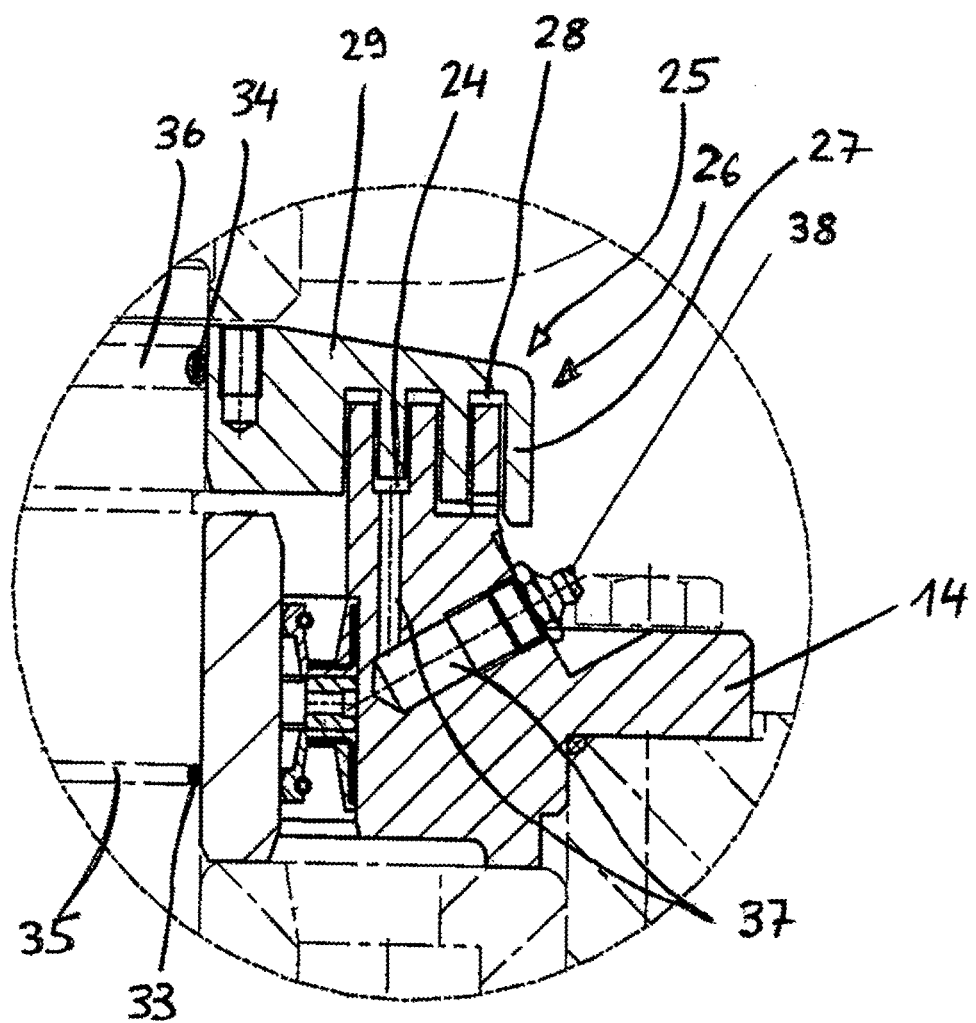
FIG. 3 shows the detail III in FIG. 1, likewise enlarged.

As can be seen in FIG. 3, the housing cover 14 has a second lubricant feed channel 37 which ends in a groove 24 of the rotary cover 29, and through which lubricant can be fed for lubricating and for improving the sealing effect of the labyrinth seal 25. The lubricant feed channel 37, in turn, is provided with a lubricating nipple 38.

The present invention is not limited to embodiments described herein; reference should be had to the appended claims.

LIST OF REFERENCE NUMBERS

100 Device
1 Power rotary head
2 Housing
3 Coupling
4 Coupling
5 Fastening device
6 Rotary drive device
7 Spindle
8 Housing cap
8' Rotary lead through
9 Roller bearing
10 Rotary seal arrangement
11 Shaft seal
11', 11" Shaft sealing rings 12 First sealing face
13 Second sealing face
14 Housing cover
15 Lateral surface
16 Sealing sleeve
17 Sealing lip
18 Sealing lip
19 First lubricant feed channel
20 Lubricating nipple
21 Front side
22 First sequence
23 Rings
24 Grooves
25 Labyrinth seal
26 Second sequence
27 Rings
28 Grooves
29 Rotary cover
30 Pin
31 Blind hole
32 Clamping ring
33 O-ring
34 O-ring
35 Receiving groove
36 Receiving groove
37 Second lubricant feed channel
38 Lubricant nipple
39 Spacer ring
P Arrow

What is claimed is:

1. A device for producing a bore in the ground, the device comprising:
 a spindle comprising a rotary lead-through and a first sealing face configured to be cylindrical, the spindle being configured so as to be rotatably led through a housing via the rotary lead-through;
 the housing comprising a second sealing face configured to be concentric with respect to the first sealing face, the housing being a part of a power rotary head (top drive);
 a rotary seal arrangement configured to seal the rotary lead-through of the spindle through the housing, the rotary seal arrangement comprising a shaft seal configured to act between the first sealing face of the spindle and the second sealing face of the housing; and
 a labyrinth seal arranged upstream of the shaft seal when viewed from an outside of the housing.

2. The device as recited in claim 1, further comprising a housing cover comprising a first sequence of rings and grooves, wherein the second sealing face is arranged on the housing cover and is configured to have the spindle pass therethrough, the first sequence of rings and grooves being configured to form a first portion of the labyrinth seal on a housing side.

3. The device as recited in claim 2, wherein the housing cover further comprises a housing cover front side, and the first sequence of rings and grooves is provided on the housing cover front side.

4. The device as recited in claim 3, further comprising a rotary cover configured to be connected to the spindle in a rotationally fixed manner, the rotary cover comprising a second sequence of rings and grooves, the second sequence of rings and grooves being configured to form a second portion of the labyrinth seal.

5. The device as recited in claim 4, wherein the rotary cover comprises a rotary cover front side which is arranged opposite to the housing cover front side, the second sequence of rings and grooves being arranged on the rotary cover front side.

6. The device as recited in claim 4, further comprising a sealing sleeve, wherein the sealing sleeve is connected to each of the spindle and to the rotary cover in a rotationally fixed manner, the first sealing face being provided on the sealing sleeve.

7. The device as recited in claim 2, wherein the housing cover further comprises a first lubricant feed channel configured to feed a lubricant to the shaft seal, and a second lubricant feed channel configured to feed lubricant to the labyrinth seal.

8. The device as recited in claim 1 for producing a substantially vertical bore in the ground, wherein the rotary seal arrangement is an upper rotary seal arrangement of a rotary drive device which is designed as a power rotary head.

9. A rotary drive device comprising the device as recited in claim 1.

* * * * *